US012724561B2

(12) United States Patent
Izzo et al.

(10) Patent No.: US 12,724,561 B2
(45) Date of Patent: Sep. 1, 2026

(54) MEMORY CONTROLLER FIRMWARE VIRTUALIZATION

(71) Applicant: Micron Technology, Inc., Boise, ID (US)

(72) Inventors: Niccolò Izzo, Vignate (IT); Danilo Caraccio, Milan (IT)

(73) Assignee: Micron Technology, Inc., Boise, ID (US)

( * ) Notice: Subject to any disclaimer, the term of this patent is extended or adjusted under 35 U.S.C. 154(b) by 99 days.

(21) Appl. No.: 17/899,900

(22) Filed: Aug. 31, 2022

(65) Prior Publication Data

US 2023/0393780 A1 Dec. 7, 2023

Related U.S. Application Data

(60) Provisional application No. 63/348,423, filed on Jun. 2, 2022.

(51) Int. Cl.
*G06F 3/06* (2006.01)

(52) U.S. Cl.
CPC .......... *G06F 3/0655* (2013.01); *G06F 3/0604* (2013.01); *G06F 3/0664* (2013.01); *G06F 3/0679* (2013.01)

(58) Field of Classification Search
CPC .... G06F 3/0655; G06F 3/0604; G06F 3/0664; G06F 3/0679
See application file for complete search history.

(56) References Cited

U.S. PATENT DOCUMENTS

| | | | | |
|---|---|---|---|---|
| 2006/0095793 | A1* | 5/2006 | Hall | G06F 12/1408 711/E12.102 |
| 2017/0026171 | A1* | 1/2017 | Lal | H04L 9/0822 |
| 2018/0107608 | A1* | 4/2018 | Kaplan | G06F 12/1466 |
| 2021/0240638 | A1* | 8/2021 | Deutsch | H04L 9/0618 |

* cited by examiner

*Primary Examiner* — Gary W. Cygiel
(74) *Attorney, Agent, or Firm* — Greenberg Traurig

(57) ABSTRACT

In some aspects, the techniques described herein relate to a device including: a datapath facilitating data transfers between a host device and a storage device; a firmware storage device storing a plurality of firmware tasks; and a processor, the processor including a hypervisor configured to: execute a given firmware task in the plurality of firmware tasks in a container, and control access to the datapath based on tags associated with instructions of the given firmware task.

20 Claims, 5 Drawing Sheets

MEMORY CONTROLLER FIRMWARE VIRTUALIZATION

RELATED APPLICATIONS

The present application claims priority to Prov. U.S. Pat. App. Ser. No. 63/348,423 filed Jun. 2, 2022, the entire disclosures of which application are hereby incorporated herein by reference.

FIELD OF THE TECHNOLOGY

At least some of the disclosed embodiments relate to securing computing devices and particularly to securing memory controllers using firmware virtualization.

BACKGROUND

Many high-level systems utilize virtualization to secure applications. For example, technologies such as DOCKER® or KUBERNETES® allow for application-level virtualization of software. Generally, such solutions rely on complex hypervisors to manage the underlying virtualized resources and require significant computing power and complex security mechanisms to operate effectively. By contrast, memory or storage controllers often operate in constrained computing environments and cannot technically implement current existing virtualizations technologies. As a result, most firmware in such low-compute devices is vulnerable to bugs and malicious attacks that can include devices using such controllers.

DETAILED DESCRIPTION

Figure 1:
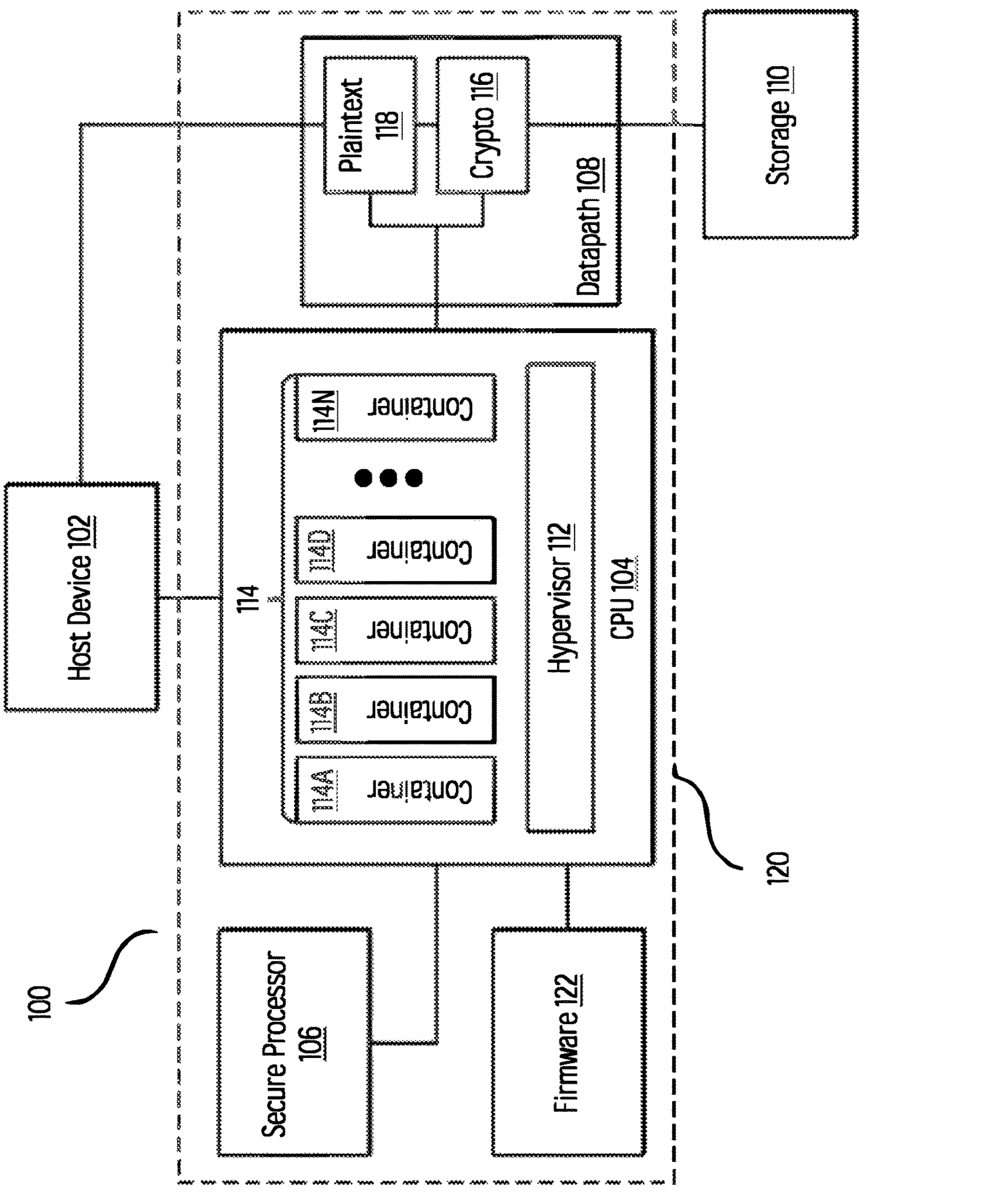
FIG. 1 is a block diagram of a containerized controller device.

The various embodiments describe herein solve the aforementioned problems by providing a lightweight hypervisor implemented in a memory or storage controller. The hypervisor ensures that firmware cannot be compromised to jump to illegal firmware instructions and thus ensures isolation among firmware tasks. The various embodiments also utilize a lookup table system for determining if a given instruction of a firmware task is allowed to access a resource. The use of a hypervisor ensures that firmware cannot be attacked as an entry point to a malicious instruction while the lookup tables finely control access to resources on a per-firmware task basis. These two features, alone or in combination, significantly reduce the attack surface of a memory or storage controller while avoiding the requirement of high-complexity hypervisor or other hardware in such controllers.

In some aspects, the techniques described herein relate to a device including: a datapath facilitating data transfers between a host device and a storage device; a firmware storage device storing a plurality of firmware tasks; and a processor, the processor including a hypervisor configured to: execute a given firmware task in the plurality of firmware tasks in a container, and control access to the datapath based on tags associated with instructions of the given firmware task.

In some aspects, the techniques described herein relate to a device, wherein the processor is configured to execute the given firmware task in a container by: loading an instruction of the given firmware task, the instruction associated with a current memory address in the firmware storage device having a first tag; and loading a target address associated with the instruction, the target address having a second tag.

In some aspects, the techniques described herein relate to a device, wherein after loading the target address the processor is further configured to execute the instruction if the first tag is equal to the second tag.

In some aspects, the techniques described herein relate to a device, wherein after loading the target address the processor is further configured to ignore the instruction if the first tag is not equal to the second tag.

In some aspects, the techniques described herein relate to a device, wherein the tags include sets of bits in corresponding memory locations of the instructions of the given firmware task.

In some aspects, the techniques described herein relate to a device, wherein the processor is configured to control access to the datapath based on tags associated with instructions of the given firmware task by reading a tag associated with a given instruction of the given firmware task and querying a lookup table of datapath access associations.

In some aspects, the techniques described herein relate to a device, wherein the datapath includes a cryptographic datapath configured to read encrypted data from the storage device and return the encrypted data to the processor.

In some aspects, the techniques described herein relate to a device, wherein the processor is further configured to issue a read operation to the cryptographic datapath when the lookup table maps the tag to the cryptographic datapath.

In some aspects, the techniques described herein relate to a device, wherein the datapath further includes a plaintext datapath configured to receive decrypted data from the cryptographic datapath and return the decrypted data to the processor.

In some aspects, the techniques described herein relate to a device, wherein the processor is further configured to issue a read operation to the plaintext datapath when the lookup table maps the tag to the plaintext datapath.

In some aspects, the techniques described herein relate to a method including: loading a firmware instruction, the firmware instruction associated with a first memory address; determining that the firmware instruction is a legal jump based on a first tag associated with the firmware instruction; determining a type of datapath access for the firmware instruction based on the first tag; and handling the firmware instruction based on the type of datapath access.

In some aspects, the techniques described herein relate to a method, wherein determining if the firmware instruction is a legal jump includes comparing the first tag to a second tag extracted from a target address of the firmware instruction.

In some aspects, the techniques described herein relate to a method, wherein determining the type of datapath access includes querying a lookup table using the first tag, wherein the lookup table includes a map of tags to datapath access types.

In some aspects, the techniques described herein relate to a method, wherein the type of datapath access includes one of access to encrypted data stored in a memory device and access to decrypted data stored in the memory device.

In some aspects, the techniques described herein relate to a method, further including extracting the first tag by reading a subset of bits from the first memory address.

In some aspects, the techniques described herein relate to a non-transitory computer-readable storage medium for tangibly storing computer program instructions capable of being executed by a computer processor, the computer program instructions defining steps of: loading a firmware instruction, the firmware instruction associated with a first memory address; determining that the firmware instruction is a legal jump based on a first tag associated with the firmware instruction; determining a type of datapath access for the firmware instruction based on the first tag; and handling the firmware instruction based on the type of datapath access.

In some aspects, the techniques described herein relate to a non-transitory computer-readable storage medium, wherein determining if the firmware instruction is a legal jump includes comparing the first tag to a second tag extracted from a target address of the firmware instruction.

In some aspects, the techniques described herein relate to a non-transitory computer-readable storage medium, wherein determining the type of datapath access includes querying a lookup table using the first tag, wherein the lookup table includes a map of tags to datapath access types.

In some aspects, the techniques described herein relate to a non-transitory computer-readable storage medium, wherein the type of datapath access includes one of access to encrypted data stored in a memory device and access to decrypted data stored in the memory device.

In some aspects, the techniques described herein relate to a non-transitory computer-readable storage medium, further including extracting the first tag by reading a subset of bits from the first memory address.

FIG. 1 is a block diagram of a containerized controller device.

As illustrated, a system 100 includes a host device 102, a controller device 120, and a storage device 110. The controller device 120 includes a main central processing unit (CPU 104), a secure processor 106, firmware 122, and a datapath 108. The CPU 104 can include a hypervisor 112 that executes one or more containers 114 (e.g., container 114A, container 114B, container 114C, container 114D, and container 114N). The specific number of containers is not limiting. The datapath 108 can include a cryptographic datapath 116 and a plaintext datapath 118. Structural aspects of these components are described herein. Functional aspects of these components are also described herein and with respect to the flow diagrams.

The host device 102 can include any computing device capable of communicating with another device, namely, controller device 120. The host device 102 can include a full-featured computing device (e.g., desktop, laptop, mobile phone) or can include a component thereof (e.g., a processor, a peripheral, a memory, etc.). The specific type of device used as host device 102 is not limiting and the specification operates with any computing device as a host device. For example, the host device can be interchangeable and thus subject to physical security attacks.

As illustrated, the controller device 120 facilitates the transfer of data between host device 102 and storage device 110. The storage device 110 can include any type of electronic device capable of storing data either non-volatilely or volatilely. For example, the storage device 110 can be a volatile memory device such as a dynamic random-access memory (DRAM) module or can be a non-volatile storage device such as a solid-state drive (SSD). The specific type of storage technology is not limiting.

The controller device 120 includes various components to ensure the integrity of the device. As illustrated, the controller device 120 can include a secure processor 106. The secure processor 106 can be a limited feature cryptoprocessor or similar type of device. The secure processor 106 can be a secure computing environment such as a secure enclave, trusted execution environment (TEE), trusted platform module (TPM), or a similar type of dedicated secure processor. The secure processor 106 can provide various functions that are callable by the CPU 104 and generally provides a reduced attack interface. For example, the secure processor 106 can provide mailbox functionality, a Joint Test Action Group (JTAG) interface, secure direct memory access (DMA) functionality, as well as more generic security functions such as encryption/decryption, key storage, signature generation, certificate storage/generation, etc. As will be discussed, the CPU 104 can communicate with the secure processor 106 to encrypt and decrypt data such as data stored in storage device 110.

The CPU 104 can operate as a higher-level, generic processing element in the controller device 120. That is, the CPU 104 performs higher-level operations when compared to the secure processor 106. For example, the CPU 104 can access user data stored in storage device 110 (via datapath 108), can communicate with the secure processor 106 (e.g., to encrypt or decrypt data, sign data, etc.), and can control the controller device 120 attestation process. Such functions may be intercepted by a malicious user or software code and compromise the entire security of the controller device 120.

Further, the CPU 104 can expose one or more interfaces that are backed by underlying firmware 122. The firmware 122 can be stored in a small non-volatile storage device (e.g., NAND Flash) accessible by memory addresses (e.g., program counter values) of the CPU 104. Examples of such interfaces include universal asynchronous receiver-transmitter (UART), Security Protocol and Data Model (SPDM), Management Component Transport Protocol (MCTP), Compute Express Link (CXL), firmware upgrade, vendor-specific, and other interfaces. Given such many interfaces, the CPU 104 necessarily exposes a larger attack surface. For example, the UART interface may only be used by controller device 120 to monitor sensor (not illustrated) readings. However, a malicious user or bug may intentionally or inadvertently grant the UART firmware access to data stored in the storage device 110. A malicious user could exploit this fact to access arbitrary data (including sensitive user data) in storage device 110 despite the UART interface never needing access to such data.

To prevent such an attack, the CPU 104 includes a hypervisor 112 and one or more containers 114 executing individual tasks (e.g., firmware tasks). Each interface can be associated with its own container. Additionally, each potential task for each interface can be associated with its own container (for higher granularity). Although the description emphasizes interfaces and underlying firmware, any processing routine can be deployed in a container.

The hypervisor 112 can be implemented using any existing hypervisor or container technology such as DOCKER®, rkt, LXC, etc. In such an implementation, the containers 114 can execute corresponding firmware 122 in such containers. However, in other implementations, the CPU 104 may not be computationally complex enough to support such existing hypervisors or container technologies.

In such an implementation, CPU 104 can implement a lightweight hypervisor using a permission table and instruction tagging scheme. In a lightweight hypervisor scheme, firmware 122 executed by CPU 104 can be tagged via unused portions of a memory address accessing commands stored in the firmware 122. That is, the address space used by CPU 104 may be larger than the available memory in firmware 122. For example, the CPU 104 may use 32-bit instructions while the firmware 122 may only have an address space of 128 MB. Thus, the CPU 104 can potentially access an address space of $2^{32}$ or approximately 4 GB while the firmware 122 only requires 27 bits to address all available 128 MB of memory addresses. As a result, in this example, the left-most five bits can be used to support $2^5$ (32) unique tags. Each unique can be assigned to a containerized interface or task. Thus, as one example UART firmware can be assigned tag 0b00001 while CXL.io firmware can be assigned tag 0b00010 etc. In this example, all UART firmware commands will be prefixed with 0b00001, etc.

During the execution of firmware, CPU 104 can operate a scheduler that schedules instructions via a program counter or similar structure. The scheduler can be responsible for ensuring that the execution of a containerized task does not jump to an unauthorized instruction in firmware 122. Consider an example of a two-bit tag and eight-bit total address length. UART firmware can be assigned to tag 0b01 while a scrubbing routine can be assigned to tag 0b10. During the execution of the UART firmware, the scheduler reads an instruction "JMP 0b100000001." Here, the scheduler can detect the tag ("0b10") of the jump (JMP) instruction and determine that the UART firmware is attempting to jump to another containerized code (the scrubbing routine) since the value of the program counter will contain a different tag (e.g., "0b01"). Since the CPU 104 is configured to isolate firmware, the CPU 104 can ignore the jump instruction and, if desired, take corrective action such as predicting the correct jump (e.g., by using the current firmware's tag).

The foregoing implementation provides a lightweight hypervisor that enforces the isolation of firmware instructions to a single address space. As such, illegal jumps can be prevented, and a scheduler of the CPU 104 ensures that firmware code can only access other firmware code instructions during execution. In addition to the above lightweight hypervisor, the CPU 104 (or datapath 108) can utilize a permission table to allow or disallow data access to data stored in storage device 110.

As illustrated in FIG. 1, datapath 108 can include a cryptographic datapath 116 and a plaintext datapath 118. In general, data received from and sent to a host device 102 is processed through plaintext datapath 118. However, before being persisted to storage device 110, the cryptographic datapath 116 can encrypt the plaintext data passed through plaintext datapath 118 before writing the data to storage device 110. Thus, storage device 110 may only store encrypted data. The cryptographic datapath 116 can utilize keys stored in secure processor 106 to encrypt data and, in some scenarios, the CPU 104 can encrypt and decrypt data for use by datapath 108.

As illustrated, the CPU 104 can access both the cryptographic datapath 116 and plaintext datapath 118. If the CPU 104 issues a read operation to cryptographic datapath 116, the cryptographic datapath 116 reads the encrypted data from storage device 110 and returns encrypted data. By contrast, if the CPU 104 issues a read operation to plaintext datapath 118, the plaintext datapath 118 returns the decrypted plaintext data. Thus, the CPU 104 can issue the same command to cryptographic datapath 116 or plaintext datapath 118 and receive either an encrypted result or decrypted result, respectively. For some firmware, access to plaintext data is needed. For example, a scrubbing operation may require access to plaintext data since the error-correcting code (ECC) values are computed on the plaintext data. As such, a scrubbing firmware code requires access to plaintext data and the CPU 104 should issue such read operations to plaintext datapath 118. By contrast, wear-leveling, allocation, and defragmenting operations generally do not need access to decrypted data. As such, CPU 104 should issue any corresponding firmware instructions to cryptographic datapath 116.

To enforce the above determination, the CPU 104 can include a table that maps the aforementioned tags to datapath access capabilities. For each read or write operation issued by a given containerized firmware code, the CPU 104 queries the lookup table using the tag in the memory address of the firmware code to determine which datapath (e.g., cryptographic datapath 116 or plaintext datapath 118) to use. Additionally, the CPU 104 may also determine that no entry exists for a given tag and can block any access to the datapath 108 (discussed further herein). The association of a tag to a datapath (or lack of a mapping) is referred to as a datapath access association or condition.

Reference is made to the previous example of a two-bit tag and eight-bit total address length. UART firmware can be assigned to tag 0b01 while a scrubbing routine can be assigned to tag 0b10. In general, UART firmware will likely never require access to plaintext data (and often will never require any access to data). As such, the tag 0b01 can be associated with the plaintext datapath 118. By contrast, the scrubbing routine will always require access to plaintext data and thus the tag 0b10 can be associated with the cryptographic datapath 116. As such, when executing the UART firmware, the CPU 104 may access an instruction at memory location 0b0100001100 which corresponds to a read operation. Since the tag is mapped to the cryptographic datapath 116, the CPU 104 issues the instruction to the cryptographic datapath 116 and returns encrypted data. If such an instruction were compromised, no plaintext data would be exposed. Similarly, if the CPU 104 processes an instruction of the scrubbing firmware at location 0b1000001100, the CPU 104 would issue the read operation to the plaintext datapath 118 and return the plaintext data.

As mentioned above, the table used by the CPU 104 can only include tags that require access to either the plaintext datapath 118 or the cryptographic datapath 116. If firmware having a tag not in the table issues an operation requiring access to the datapath, the CPU 104 can detect that the tag is not in the table and block the request, preventing access. For example, a UART interface may not require datapath access and as such the example above would be modified to block any access to either encrypted or plaintext data.

The foregoing description emphasizes the use of lookup tables to allow, disallow, or multiplex requests for datapath access. However, the same techniques can be used for other components of controller device 120. For example, the CPU 104 can implement a table for each component of the controller device 120 (e.g., sensors, frontend registers, access to secure processor 106, etc.). Further, individual capabilities can be assigned to a lookup table. For example, a lookup table for datapath reads and a lookup table for datapath writes can be maintained such that the CPU 104 queries the corresponding table based on the type of command. As another example, a scrubbing firmware can be prevented from returning data to a host device 102. Thus, even if the scrubbing firmware is compromised, the CPU 104 can block the return of any data to the host device 102.

In the foregoing description, a lightweight hypervisor provides container-level isolation to prevent malicious and arbitrary code execution via jump instructions. A table-based access mechanism is then used to prevent hijacked firmware from performing operations that it is normally capable of executing. As such, the controller device 120 significantly reduces the attack surface of a memory device.

Figure 2:
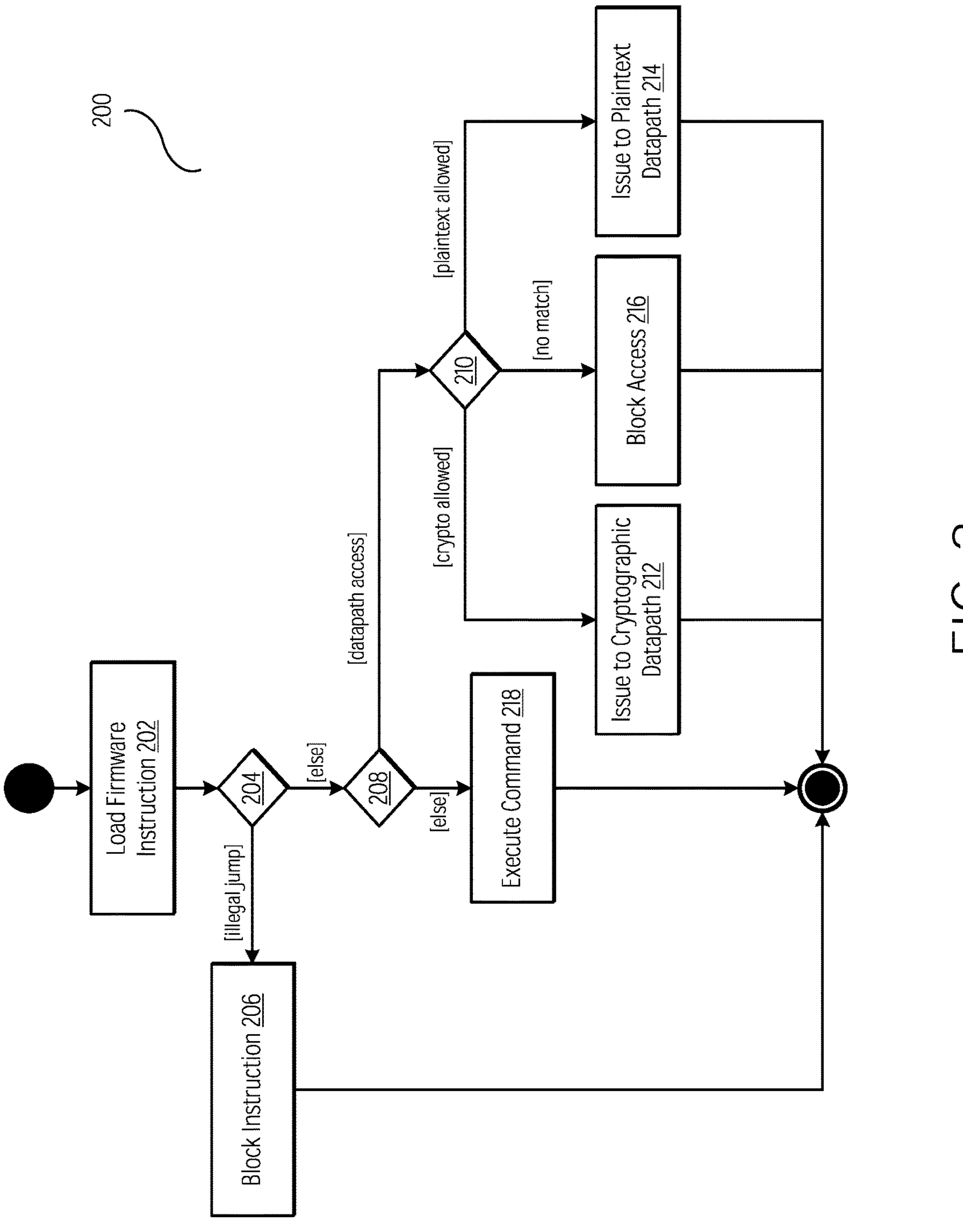
FIG. 2 is a flow diagram illustrating a method for securing a memory controller via containerization.

FIG. 2 is a flow diagram illustrating a method for securing a memory controller via containerization.

In step 202, method 200 can include loading a firmware instruction. Method 200 can execute step 202 for each firmware instruction to be processed by the device (e.g., memory controller). Step 202 can thus be part of one or more stages of an instruction pipeline. For example, step 202 can be implemented as part of an instruction fetch or instruction decode stage of such a pipeline executed by a CPU. In general, any stage prior to execution of an instruction can be modified to implement step 202. In brief, step 202 can include reading the value of a program counter and loading the instruction from a memory address associated with the program counter.

In step 204, method 200 can include determining if the firmware instruction is an illegal jump. As discussed above, in step 202, method 200 can load an instruction (e.g., opcode and operands) from the memory address of the current program counter. Step 204 can include first determining if the instruction is a jump instruction by analyzing the opcode. For example, step 204 can determine if the binary representation in a known portion of the returned data matches a known jump opcode. Although jumps are discussed, any instruction that changes the value of the program counter can be identified and processed as described herein for jumps.

Method 200 can determine if a jump is illegal by analyzing the address associated with the jump. The address may include a fixed number of bits and may include a tag as the first subset of bits (discussed above). Thus, step 204 can include determining if the first N bits of the program counter and the first N bits of the jump address are the same. If so, method 200 can proceed to step 208. However, if the first N bits do not match, method 200 can proceed to step 206 wherein method 200 can block the execution of the jump (or similar instruction). Step 206 can include dropping the instruction, executing a NOOP or skip instruction (or similar instruction), or raising an interrupt to halt the processing of the firmware. Alternatively, step 206 can include replacing the first N bits of the jump address with the first N bits of the program counter. Further detail on step 204 is provided in FIG. 3 and not repeated herein. Method 200 proceeds to step 208 if the jump instruction is valid.

In step 208, method 200 can include determining if the instruction requires datapath access. Step 208 may be implemented implicitly in the memory access stage of a data pipeline. Specifically, every instruction that needs memory access will be processed by this memory access stage, and thus step 208 can be implemented as part of the memory access stage. If a given instruction does not need to access memory (e.g., operates only on register data), method 300 can proceed to step 218 and execute the command as part of the instruction execution stage of a pipeline.

If, however, method 200 determines in step 208 that the instruction requires datapath access, method 200 proceeds to step 210. Examples of instruction requiring datapath access include memory read and write instructions. Such instructions may be valid instructions in a firmware task or routing (e.g., a memory scrubbing task).

In step 210, method 200 can include determining the type of datapath access to grant or allow for a given instruction. Details of this decision are provided in FIG. 4 and not repeated herein. In general, step 210 will branch to step 212, step 214, or step 216 based on the decision made in step 210. This decision can be based on the tag of the instruction loaded from memory in step 202.

In step 212, method 200 can include issuing an instruction to a cryptographic datapath. In this step, method 200 issues the instruction (e.g., read or write) to a cryptographic subset of a datapath. As discussed in more detail in FIG. 1, a memory device can be configured to only store encrypted data. As such, the cryptographic datapath can be figured to read encrypted data and return encrypted data to the calling device (e.g., CPU). Thus, in step 212, method 200 includes loading encrypted data from memory and returning the encrypted data to the CPU (for writing to a register, etc.). As such, while the instruction may simply request reading from a memory address (i.e., a standard read command), the decision in step 210 ensures that only encrypted data is returned and prevents accidental exposure of plaintext data.

In step 214, method 200 can include issuing the instruction to a plaintext datapath. As described in FIG. 1, the plaintext datapath can comprise a subset of the datapath that receives decrypted data from the cryptographic datapath. In such a system, the cryptographic datapath receives a read instruction from the plaintext datapath, load and decrypt the data stored in memory, and return decrypted data. Similar to step 212, if the instruction is granted access to plaintext data, the CPU executing method 200 can issue the instruction to the plaintext datapath and not the cryptographic datapath, thus exposing decrypted data.

In step 216, method 200 can alternatively block all access to memory for the given instruction. In this step, the decision process in step 210 was unable to identify a match for a given instruction tag and thus all memory access can be blocked. As such, method 200 can execute a NOOP or skip instruction in lieu of accessing the datapath.

Notably, as discussed above, the foregoing steps may be modified to allow for other types of resource control. For example, access to register data can be protected using a separate register lookup table. For example, a stack pointer register can be associated with a lookup table and only certain tags may be allowed to access the stack pointer register. In such a scenario, step 208 can be modified to determine if the instruction is accessing the stack pointer register, step 210 can be modified to query the stack pointer lookup table, and steps 212 through 216 can be replaced with binary steps (i.e., to allow or deny access to the stack pointer register based on a result of the query). The foregoing example is not limiting, and other types of resource control can utilize the described method 200. Indeed, in some implementations, multiple types of access checks can be performed simultaneously for multiple resources of the system.

Figure 3:
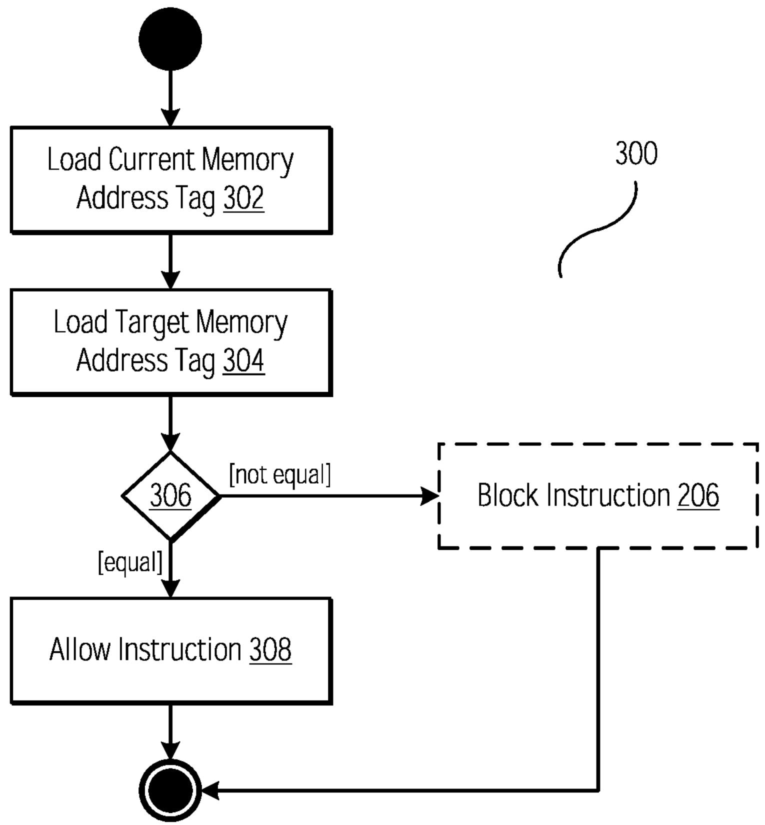
FIG. 3 is a flow diagram illustrating a method for determining if a given firmware instruction is executable.

FIG. 3 is a flow diagram illustrating a method for determining if a given firmware instruction is executable.

In step 302, method 300 can include loading the current memory address tag. The current memory address can be the value of a program counter read from a program counter register during the instruction fetch stage of a processing pipeline. Thus, step 302 can include reading a tag for the current program counter value. As discussed in FIG. 2, step 302 can be executed for every instruction read from the program counter address of a CPU.

The tag for a current memory address can include a subset of the bits of the memory address. As discussed in the description of FIG. 1, the first N bits of a memory address may be used as the tag. The value of N may be chosen based on the underlying storage needs for storing the firmware. That is, if the address size of the CPU is M bits and the addressable size of the storage device for the firmware is P bits, N=M−P bits can be used as the size of a tag. The first N bits of the memory address can be used as the tag bits. Given that the firmware storage device does not require these top N bits to address all memory, there is no risk of using these bits arbitrarily and, indeed, the CPU or firmware storage device can be configured (if necessary) to ignore these bits when fetching instructions from the firmware storage device.

In step 304, method 300 can include loading a target memory address tag.

The target memory address can be the memory address included in the instruction located at the current memory address. Thus, step 304 can be executed after the instruction fetch stage when the opcode and operand (e.g., memory address) for the current instruction are retrieved. In some implementations, step 304 can be implemented after the instruction decode stage to enable handling jump instructions that reference register values. In either scenario, in step 304, method 300 obtains an opcode of a jump instruction (or other instruction affecting the program counter) and a target memory address.

The processing in step 304 is similar to that in step 302 and is not reiterated herein. In brief, step 304 can include reading a subset of the bits from the target memory address (e.g., the top N bits) as the target memory address tag. Generally, the bit positions used in step 304 and step 302 are identical, however, the disclosure need not be limited as such.

In step 306, method 300 can include comparing the current memory address tag (retrieved in step 302) and the target memory address tag (retrieved in step 304) and determining if the two tags are equal. In existing processors, a CPU loading a jump instruction would update the program counter accordingly to perform the jump. However, in step 306, method 300 can include a conditional step to determine whether to proceed to execute the jump. Specifically, as illustrated, method 300 will only proceed to allow the instruction (step 308) if the two tags are equal. If the tags are equal, method 300 allows the instruction by, for example, executing the jump instruction and changing the value of the program counter register.

In contrast, if the tags are not equal, method 300 blocks the instruction in step 206. Details of blocking an instruction are provided in the foregoing description of step 206 in FIG. 2 and are not repeated herein. As such, method 300 provides a conditional jump operation that is triggered based on matching tags within a program counter value and the memory address of the jump. As described in more detail in FIG. 1, these tags can be assigned to specific firmware and thus simulate a containerized environment.

Figure 4:
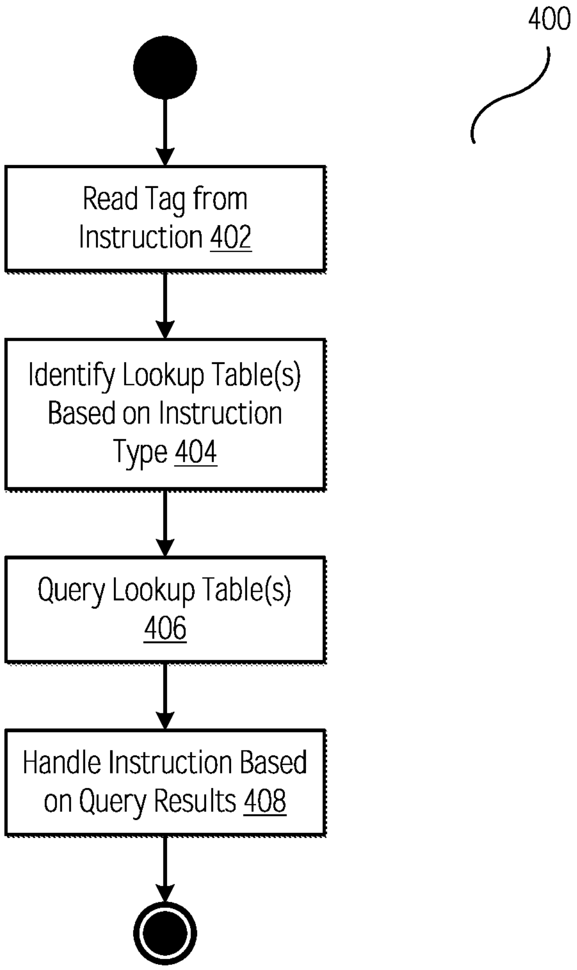
FIG. 4 is a flow diagram illustrating a method for determining access permissions for a given firmware instruction.

FIG. 4 is a flow diagram illustrating a method for determining access permissions for a given firmware instruction.

In step 402, method 400 can include reading a tag from an instruction. As described above, the tag can comprise a set of bits from the program counter representing the instruction. For example, the top N bits of the program counter address can be read, as described in the various foregoing examples.

In step 404, method 400 can include identifying one or more lookup tables based on the type of instruction and, in step 406, querying the lookup tables.

Method 400 can access a plurality of lookup tables. These lookup tables can be associated with different resources (e.g., memory, registers, sensors, etc.) or also with various actions taken with respect to resources (e.g., memory read, memory write, memory erase, sensor read, register read, etc.). Generally, any type of resource or action taken thereon can be associated with a lookup table.

Step 404 can include determining which lookup tables are relevant to a given instruction associated with the program counter. As one example, a meta-table that maps opcodes to lookup tables can be stored and used to quickly access the appropriate lookup tables. For example, method 400 can use a first lookup table associated with reading from a register and a second lookup table for reading from memory. Thus, if an instruction requires a read from the first register to compute a memory address to read from, method 400 will use both lookup tables to determine if the instruction is allowed.

The lookup tables can comprise mappings of tags to permissions or associations (e.g., datapath access associations). For example, a first tag can be mapped to plaintext datapath access, a second tag can be associated with cryptographic datapath access, etc. In step 406, when method 400 queries the lookup table a result indicating this association is returned.

In step 408, method 400 can include handling the instructions based on the result of the query in step 406. Details of how to handle a query result are provided in the description of step 212, step 214, and step 216 of FIG. 2 and are not repeated herein. In brief, method 400 can allow or disallow instruction access to a resource (or function thereof) based on the mapping in the lookup tables (or a missing mapping). For example, method 400 can determine whether to route a memory instruction to a plaintext or cryptographic datapath based on the results of the query.

Figure 5:
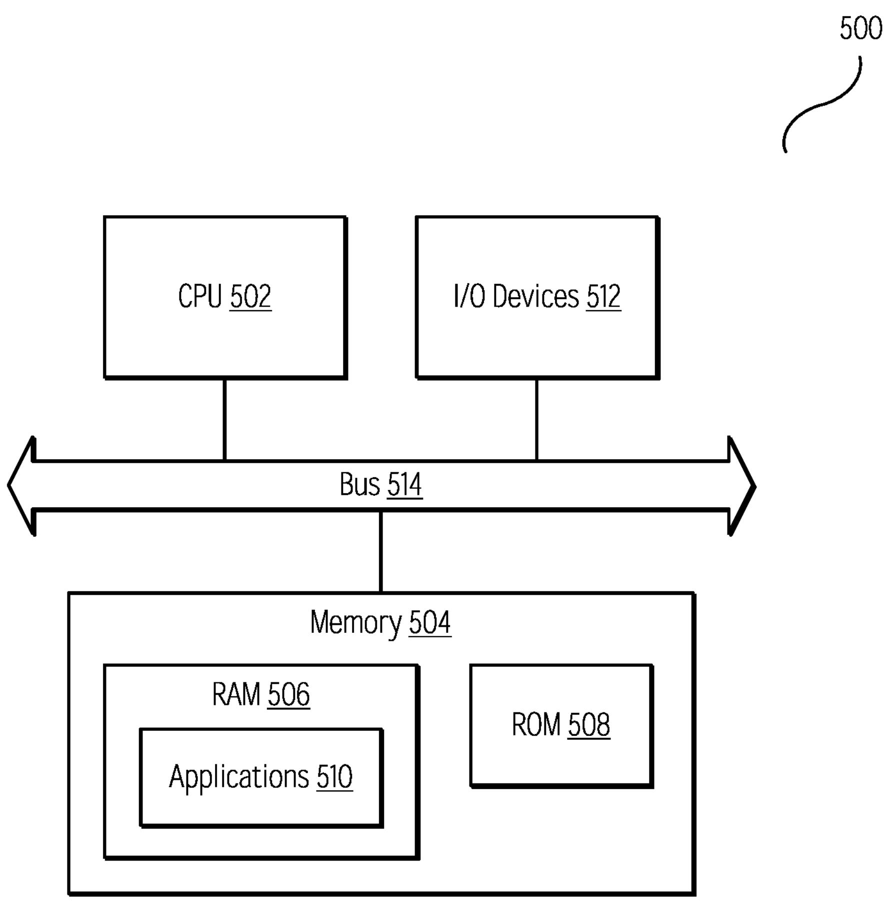
FIG. 5 is a block diagram of a computing device.

FIG. 5 is a block diagram of a computing device.

As illustrated, the device 500 includes a processor (CPU 502) in communication with a memory 504 via a bus 514. The device also includes one or more input/output (I/O) or peripheral devices 512. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

The CPU 502 may be a general-purpose CPU. The CPU 502 may be a single-core or multiple-core CPU. The CPU 502 may comprise a system-on-a-chip (SoC) or a similar embedded system. A graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. The bus 514 may comprise a Peripheral Component Interconnect Express (PCIe) bus. The bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. The software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. However, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A device comprising:

a datapath facilitating data transfers between a host device and a storage device;

a firmware storage device storing a plurality of firmware tasks; and a processor, the processor comprising a hypervisor configured to:

execute a given firmware task in the plurality of firmware tasks in a container, wherein the container isolates the given firmware task from other firmware tasks of the plurality of firmware tasks by restricting jump instructions to memory addresses sharing a same tag value, and control access to the datapath based on tags associated with instructions of the given firmware task, wherein the tags comprise a subset of bits of memory addresses in the firmware storage device, wherein each firmware task of the plurality of firmware tasks is assigned a unique tag value embedded in upper bits of the memory addresses storing the firmware task's instructions, and wherein the processor queries a lookup table using the tag to determine whether to route data access to a cryptographic datapath or a plaintext datapath.

2. The device of claim 1, wherein the processor is configured to execute the given firmware task in a container by:

loading an instruction of the given firmware task, the instruction associated with a current memory address in the firmware storage device having a first tag.

3. The device of claim 2, further comprising loading from or storing into a target address associated with the instruction, the target address having a second tag.

4. The device of claim 3, wherein after loading the target address, the processor is further configured to execute the instruction if the first tag is equal to the second tag.

5. The device of claim 3, wherein after loading the target address the processor is further configured to ignore the instruction if the first tag is not equal to the second tag.

6. The device of claim 1, wherein the tags comprise sets of bits in corresponding memory locations of the instructions of the given firmware task.

7. The device of claim 1, wherein the processor is configured to control access to the datapath based on tags associated with instructions of the given firmware task by reading a tag associated with a given instruction of the given firmware task and querying a lookup table of datapath access associations.

8. The device of claim 7, wherein the datapath includes a cryptographic datapath configured to read encrypted data from the storage device and return the encrypted data to the processor.

9. The device of claim 8, wherein the processor is further configured to issue a read operation to the cryptographic datapath when the lookup table maps the tag to the cryptographic datapath.

10. The device of claim 8, wherein the datapath further includes a plaintext datapath configured to receive decrypted data from the cryptographic datapath and return the decrypted data to the processor.

11. The device of claim 10, wherein the processor is further configured to issue a read operation to the plaintext datapath when the lookup table maps the tag to the plaintext datapath.

12. A method comprising:

loading, by a processor, a firmware instruction, the firmware instruction associated with a first memory address;

determining, by the processor, that the firmware instruction is a legal jump based on a first tag associated with the firmware instruction, wherein determining that the firmware instruction is a legal jump comprises verifying that the first tag matches a tag embedded in a target address of the firmware instruction, the first tag and the tag each embedded in upper bits of respective memory addresses in a firmware storage device;

determining, by the processor, a type of datapath access for the firmware instruction based on the first tag; and handling, by the processor, the firmware instruction based on the type of datapath access, wherein the tags comprise a subset of bits of memory addresses in the firmware storage device, wherein each firmware task of the plurality of firmware tasks is assigned a unique tag value embedded in upper bits of the memory addresses storing the firmware task's instructions, and wherein the processor queries a lookup table using the tag to determine whether to route data access to a cryptographic datapath or a plaintext datapath.

13. The method of claim 12, wherein determining if the firmware instruction is a legal jump comprises comparing the first tag to a second tag extracted from a target address of the firmware instruction.

14. The method of claim 12, wherein determining the type of datapath access comprises querying a lookup table using the first tag, wherein the lookup table comprises a map of tags to datapath access types.

15. The method of claim 14, wherein the type of datapath access comprises one of access to encrypted data stored in a memory device and access to decrypted data stored in the memory device.

16. A non-transitory computer-readable storage medium for tangibly storing computer program instructions capable of being executed by a computer processor, the computer program instructions defining steps of:

loading a firmware instruction, the firmware instruction associated with a first memory address;

determining that the firmware instruction is a legal jump based on a first tag associated with the firmware instruction, wherein determining that the firmware instruction is a legal jump comprises verifying that the first tag matches a tag embedded in a target address of the firmware instruction, the first tag and the tag each embedded in upper bits of respective memory addresses in a firmware storage device;

determining a type of datapath access for the firmware instruction based on the first tag; and handling the firmware instruction based on the type of datapath access, wherein the tags comprise a subset of bits of memory addresses in the firmware storage device, wherein each firmware task of the plurality of firmware tasks is assigned a unique tag value embedded in upper bits of the memory addresses storing the firmware task's instructions, and wherein the processor queries a lookup table using the tag to determine whether to route data access to a cryptographic datapath or a plaintext datapath.

17. The non-transitory computer-readable storage medium of claim 16, wherein determining if the firmware instruction is a legal jump comprises comparing the first tag to a second tag extracted from a target address of the firmware instruction.

18. The non-transitory computer-readable storage medium of claim 16, wherein determining the type of datapath access comprises querying a lookup table using the first tag, wherein the lookup table comprises a map of tags to datapath access types.

19. The non-transitory computer-readable storage medium of claim 18, wherein the type of datapath access comprises one of access to encrypted data stored in a memory device and access to decrypted data stored in the memory device.

20. The non-transitory computer-readable storage medium of claim 16, further comprising extracting the first tag by reading a subset of bits from the first memory address.

* * * * *